(12) United States Patent
Higuchi et al.

(10) Patent No.: US 7,510,488 B2
(45) Date of Patent: Mar. 31, 2009

(54) SOLID GOLF BALL

(75) Inventors: Hiroshi Higuchi, Chichibu (JP);
Hiroyuki Nagasawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 12/017,604

(22) Filed: Jan. 22, 2008

(65) Prior Publication Data
US 2008/0194359 A1 Aug. 14, 2008

Related U.S. Application Data

(63) Continuation-in-part of application No. 11/705,453, filed on Feb. 13, 2007, now Pat. No. 7,344,455.

(51) Int. Cl.
*A63B 37/06* (2006.01)

(52) U.S. Cl. ............................................. 473/373

(58) Field of Classification Search ................ 473/373, 473/374, 367, 368
See application file for complete search history.

(56) References Cited

U.S. PATENT DOCUMENTS

| | | | |
|---|---|---|---|
| 4,570,937 A * | 2/1986 | Yamada | 473/377 |
| 5,516,110 A | 5/1996 | Yabuki et al. | |
| 5,752,889 A | 5/1998 | Yamagishi et al. | |
| 5,803,833 A * | 9/1998 | Nakamura et al. | 473/377 |
| 5,848,943 A | 12/1998 | Sano et al. | |
| 5,929,189 A | 7/1999 | Ichikawa et al. | |
| 6,277,924 B1 | 8/2001 | Hamada et al. | |
| 6,302,810 B2 | 10/2001 | Yokota | |
| 6,386,993 B1 | 5/2002 | Yokota | |
| 6,582,325 B1 | 6/2003 | Ichikawa et al. | |
| 6,642,314 B2 | 11/2003 | Sone et al. | |
| 6,758,766 B2 | 7/2004 | Watanabe | |
| 6,786,836 B2 | 9/2004 | Higuchi et al. | |
| 6,837,804 B2 | 1/2005 | Watanabe et al. | |
| 6,887,168 B2 | 5/2005 | Hayashi et al. | |
| 7,059,975 B2 | 6/2006 | Sasaki et al. | |
| 2004/0147694 A1 | 7/2004 | Sone et al. | |

FOREIGN PATENT DOCUMENTS

| | | |
|---|---|---|
| JP | 6-98949 A | 4/1994 |
| JP | 7-268132 A | 10/1995 |
| JP | 9-215778 A | 8/1997 |
| JP | 9-271538 A | 10/1997 |
| JP | 9-308708 A | 12/1997 |
| JP | 10-127823 A | 5/1998 |
| JP | 11-35633 A | 2/1999 |
| JP | 11-178949 A | 7/1999 |
| JP | 11-290479 A | 10/1999 |
| JP | 2001-259080 A | 9/2001 |
| JP | 2002-293996 A | 10/2002 |
| JP | 2002-355338 A | 12/2002 |
| JP | 2003-70936 A | 3/2003 |
| JP | 2003-180879 A | 7/2003 |
| JP | 2004-180793 A | 7/2004 |

OTHER PUBLICATIONS

Report of Research and Development, vol. 23, No. 9. pp. 5-15.
Mason et al., "Hydrolysis of Tri-tert-butylaluminum", J. Am Chem Soc. 1993, vol. 115, pp. 4971-4984.
Harlan et al., "Three-Coordinate Aluminum is Not a Prerequisite for Catalytic Activity in the Zirconocene", J. Am Chem. Soc., 1995, vol. 117, pp. 6465-6474.

* cited by examiner

*Primary Examiner*—Raeann Trimiew
(74) *Attorney, Agent, or Firm*—Sughrue Mion, PLLC

(57) ABSTRACT

The invention provides a solid golf ball having a solid core and a cover layer that encases the core and has an outermost layer on an outside surface of which are formed a plurality of dimples. The solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, an inorganic filler, and an antioxidant. The solid core has a deformation, when compressed under a final load of 130 kgf from an initial load of 10 kgf, of from 2.0 to 4.0 mm, and has a specific hardness distribution. The cover layer has a thickness of from 0.5 to 1.9 mm, and a Shore D hardness at the surface of from 50 to 70. The ball has at least one intermediate layer between the core and the cover, any one of which intermediate layer or layers has a surface hardness in Shore D units of from 40 to 60, the intermediate layer or layers having a total thickness of from 0.9 to 7.0 mm. The golf ball has a deformation, when compressed under a final load of 130 kgf from an initial load of 10 kgf, of from 2.0 to 3.8 mm. The solid golf ball is advantageous overall in competitive use.

18 Claims, No Drawings

SOLID GOLF BALL

CROSS-REFERENCE TO RELATED APPLICATION

This application is a continuation-in-part of application Ser. No. 11/705,453 filed on Feb. 13, 2007, now U.S. Pat. No. 7,344,455 the entire contents of which are hereby incorporated by reference.

BACKGROUND OF THE INVENTION

The present invention relates to a solid golf ball having a solid core and a cover layer which encases the core. More particularly, the invention relates to a solid golf ball which has a good deformation, especially on full shots with a driver at low head speeds, and thus an excellent flight performance, which also has a good controllability on approach shots and a good feel on impact, and which moreover has an excellent scuff resistance and durability to cracking.

Two-piece solid golf balls designed to satisfy the overall characteristics desired in a golf ball, such as good flight performance, feel on impact and controllability on approach shots, have hitherto been improved in various ways. One example is the golf ball described in JP-A 6-98949.

However, because such a golf ball has a hard cover, there are problems with its spin performance.

In addition, JP-A 9-308708, JP-A 2003-70936 and JP-A 2003-180879, for example, disclose solid golf balls in which the feel and controllability have been improved without a loss of rebound or cut resistance by setting the thickness, flexural rigidity and Shore D hardness of the cover within specific ranges.

Yet, because these golf balls have an inadequate core resilience and the core hardness distribution has not been optimized, properties such as the distance and the spin performance leave something to be desired.

JP-A 9-215778, JP-A 9-271538 and JP-A 11-178949 disclose solid golf balls in which a polyurethane material is used as the cover material. However, in these golf balls, the core lacks an adequate resilience and the resin from which the cover is formed has a less than adequate scuff resistance. Hence, there remains room for improvement in the distance traveled by the ball and the scuff resistance of the cover.

The golf balls described in JP-A 2002-355338 and JP-A 2004-180793 do have a good core resilience, but because these balls have a large deflection hardness and are soft, the rebound by the ball decreases, resulting in a less than satisfactory distance.

Moreover, in JP-A 2002-355338, an ionomer is used as the cover material, but the golf ball has a poor scuff resistance and the core does not have an optimized hardness distribution, as a result of which the ball rebound remains insufficient.

With regard to two-piece solid golf balls, JP-A 11-290479, JP-A 10-127823 and JP-A 2001-25908 describe art in which the hardness distribution such as at the center and surface of a rubber core is optimized. Yet, the rubber core in these golf balls has a resilience which falls short of what is desired, leaving room for improvement in the distance traveled by the ball.

Accordingly, it is an object of the present invention to provide a solid golf ball which has a good deformation, especially on full shots with a driver at low head speeds, and thus an excellent flight performance, which also has a good controllability on approach shots and a good feel on impact, and which moreover has an excellent scuff resistance and durability to cracking.

SUMMARY OF THE INVENTION

The inventor, having conducted extensive investigations in order to achieve the above object, has found that when, as the primary improvement in a solid golf ball having a polyurethane cover with relatively soft properties, a suitable amount of antioxidant is added to the core-forming rubber composition so as to soften the core surface and thus optimize the core hardness distribution by making the core hardest at the interior thereof, there can be obtained a golf ball having an even better distance when struck with a driver at a low head speed (HS) in a range of about 30 to 40 m/s, and an improved feel on impact and scuff resistance. Moreover, in this solid golf ball, compared with conventional cover layers made of materials such as ionomer resins, the cover layer has a low flexural rigidity for the hardness thereof, which affords the ball an excellent spin performance and spin stability. This solid golf ball also has an excellent scuff resistance and excellent durability to cracking with repeated impact. In addition, the golf ball has at least one intermediate layer between the core and the cover. By setting the surface hardness of any one of the intermediate layer or layers and the total thickness of the intermediate layer or layers within specific ranges, the reduction in the spin rate of the ball and the ball rebound can be enhanced, enabling the distance traveled by the ball to be increased even further. Based on these findings, the solid golf ball of the invention has the following solid core I, cover layer II and intermediate layer III, and has a deformation, when compressed under a final load of 130 kgf from an initial load of 10 kgf, of from 2.0 to 3.8 mm.

I. Solid Core
(i) The solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, an inorganic filler, and an antioxidant.
(ii) The solid core has a deformation, when compressed under a final load of 130 kgf from an initial load of 10 kgf, of from 2.0 to 4.0 mm.
(iii) The solid core has the hardness distribution shown in the table below.

TABLE 1

| Hardness Distribution in Solid Core | Shore D hardness |
|---|---|
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q) − (S)] | 1 to 10 |
| Hardness difference [(S) − (R)] | 3 to 10 |

II. Cover Layer
(i) The cover layer is formed by injection molding a single resin blend composed primarily of a polyurethane material, and preferably composed primarily of (A) a thermoplastic polyurethane and (B) a polyisocyanate compound, which resin blend includes a polyisocyanate compound in at least some portion of which all the isocyanate groups on the molecule remain in an unreacted state.
(ii) The cover layer has a thickness of from 0.5 to 1.9 mm, and a Shore D hardness at the surface of from 50 to 70.

III. Intermediate Layer

The ball has at least one intermediate layer between the above-described core and the above-described cover, any one of which intermediate layer or layers has a Shore D surface hardness of from 40 to 60. The intermediate layers have a total thickness of from 0.9 to 7.0 mm.

Accordingly, the invention provides the following solid golf balls.

[1] A solid golf ball comprising a solid core and a cover layer that encases the core and has an outermost layer on an outside surface of which are formed a plurality of dimples, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, an inorganic filler, and an antioxidant; the solid core has a deformation, when compressed under a final load of 130 kgf from an initial load of 10 kgf, of from 2.0 to 4.0 mm, and has the hardness distribution shown in the table below; the cover layer has a thickness of from 0.5 to 1.9 mm and a Shore D hardness at the surface of from 50 to 70; the ball has at least one intermediate layer between the core and the cover, any one of which intermediate layer or layers has a surface hardness in Shore D units of from 40 to 60, the intermediate layer or layers having a total thickness of from 0.9 to 7.0 mm; and the golf ball has a deformation, when compressed under a final load of 130 kgf from an initial load of 10 kgf, of from 2.0 to 3.8 mm.

| Hardness Distribution in Solid Core | Shore D hardness |
| --- | --- |
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q) − (S)] | 1 to 10 |
| Hardness difference [(S) − (R)] | 3 to 10 |

[2] The solid golf ball of [1], wherein the surface hardness of the solid core is lower than the surface hardness of the cover layer, the difference therebetween in Shore D hardness units being from 5 to 20, and at least one intermediate layer has a surface hardness difference with the core, in Shore D hardness units, of 5 or less.

[3] The solid golf ball of [1], wherein the difference between the surface hardness of the solid core and the center hardness of the solid core, in Shore D hardness units, is from 7 to 17.

[4] The solid golf ball of [1], wherein the solid core has a diameter of from 31 to 40 mm and the golf ball has a diameter of from 42.67 to 44.0 mm.

[5] The solid golf ball of [1], wherein the solid core contains from 33 to 45 parts by weight of the unsaturated carboxylic acid or a metal salt thereof, from 0.1 to 1.0 part by weight of the organic peroxide, from 5 to 80 parts by weight of the inorganic filler, and from 0.2 to 1.0 part by weight of the antioxidant per 100 parts by weight of the base rubber.

[6] The solid golf ball of [1], wherein the dimples total in number from 250 to 420, have an average depth of from 0.125 to 0.150 mm and an average diameter of from 3.7 to 5.0 mm for all dimples, and are configured from at least four dimple types.

[7] The solid golf ball of [1], wherein one or more intermediate layer is composed of a resin which is a mixture obtained by blending as essential ingredients:

100 parts by weight of a resin component composed of, in admixture, a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100/0 and 0/100, and (e) a non-ionomeric thermoplastic elastomer in a weight ratio between 100:0 and 50:50;

(c) 5 to 80 parts by weight of a fatty acid and/or fatty acid derivative having a molecular weight of from 228 to 1500; and (d) 0.1 to 17 parts by weight of a basic inorganic metal compound capable of neutralizing un-neutralized acid groups in the base resin and component (c).

[8] The solid golf ball of [1], wherein the cover layer is formed by injection molding a single resin blend composed primarily of (A) a thermoplastic polyurethane and (B) a polyisocyanate compound, which resin blend contains a polyisocyanate compound in at least some portion of which all the isocyanate groups on the molecule remain in an unreacted state.

[9] The solid golf ball of [1], wherein the resin blend further includes (C) a thermoplastic elastomer other than a thermoplastic polyurethane.

[10] The solid golf ball of [9] wherein, in the resin blend, some portion of the isocyanate groups in component B form bonds with active hydrogens in component A and/or component C, and all other isocyanate groups remain within the resin blend in an unreacted state.

[11] The solid golf ball of [9], wherein the ingredients in the resin blend have a weight ratio therebetween, expressed as A:B:C, of from 100:{2 to 50}:{0 to 50}.

[12] The solid golf ball of [9], wherein the ingredients in the resin blend have a weight ratio therebetween, expressed as A:B:C, of from 100:{2 to 30}:{8 to 50}.

[13] The solid golf ball of [1], wherein components A and B have a combined weight which is at most 90 wt % of the weight of the cover layer as a whole.

[14] The solid golf ball of [1], wherein the resin blend has a melt mass flow rate (MFR) at 210° C. of at least 5 g/10 min.

[15] The solid golf ball of [1], wherein component B is one or more polyisocyanate compound selected from the group consisting of 4,4'-diphenylmethane diisocyanate, 2,4-toluene diisocyanate, 2,6-toluene diisocyanate, p-phenylene diisocyanate, xylylene diisocyanate, naphthylene 1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate.

[16] The solid golf ball of [1], wherein component B is one or more polyisocyanate compound selected from the group consisting of 4,4'-diphenylmethane diisocyanate, dicyclohexylmethane diisocyanate and isophorone diisocyanate.

[17] The solid golf ball of [1], wherein component C is one or more thermoplastic elastomer selected from the group consisting of polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins.

[18] The solid golf ball of [1], wherein component C is one or more thermoplastic elastomer selected from the group consisting of polyester elastomers, polyamide elastomers and polyacetals.

DETAILED DESCRIPTION-OF THE INVENTION

The invention is described more fully below. The solid golf ball according to the invention is a multi-piece solid golf ball having a solid core and a cover layer that encloses the solid core, and additionally having an intermediate layer between the solid core and the cover layer. The respective layers are described in detail below.

The solid core is a hot-molded material made of a rubber composition in which polybutadiene serves as the base rubber.

It is critical for the polybutadiene to have a cis-1,4 bond content of at least 60%, preferably at least 80%, more preferably at least 90%, and most preferably at least 95%. Moreover, the polybutadiene has a 1,2-vinyl bond content of generally 2% or less, preferably 1.7% or less, and most preferably 1.5% or less. Outside of these ranges, the resilience decreases.

It is recommended that the polybutadiene have a Mooney viscosity ($ML_{1+4}$ (100° C.)) of at least 30, preferably at least 35, more preferably at least 40, even more preferably at least 50, and most preferably at least 52, but not more than 100, preferably not more than 80, more preferably not more than 70, and most preferably not more than 60.

The term "Mooney viscosity" used herein refers in each instance to an industrial indicator of viscosity (JIS K6300) as measured with a Mooney viscometer, which is a type of rotary plastometer. The unit symbol used is $ML_{1+4}$ (100° C.), where "M" stands for Mooney viscosity, "L" stands for large rotor (L-type), "1+4" stands for a pre-heating time of 1 minute and a rotor rotation time of 4 minutes, and the "100° C." indicates that measurement was carried out at a temperature of 100° C.

The polybutadiene has a polydispersity index Mw/Mn (where Mw is the weight-average molecular weight, and Mn is the number-average molecular weight) of generally at least 2.0, preferably at least 2.2, more preferably at least 2.4, and even more preferably at least 2.6, but generally not more than 6.0, preferably not more than 5.0, more preferably not more than 4.0, and even more preferably not more than 3.4. A polydispersity Mw/Mn that is too low may lower the workability, whereas one that is too high may lower the rebound.

The polybutadiene is one that is synthesized with a rare-earth catalyst. A known rare-earth catalyst may be used for this purpose.

Exemplary rare-earth catalysts include those composed of a combination of a lanthanide series rare-earth compound, an organoaluminum compound, an alumoxane, a halogen-bearing compound and an optional Lewis base.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon group of 1 to 8 carbons).

Preferred alumoxanes include compounds of the structures shown in formulas (I) and (II) below. The alumoxane association complexes described in *Fine Chemical* 23, No. 9, 5 (1994), *J. Am. Chem. Soc.* 115, 4971 (1993), and *J. Am. Chem. Soc.* 117, 6465 (1995) are also acceptable.

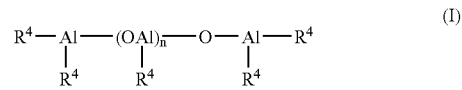

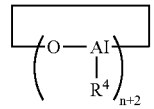

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon group of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base can be used to form a complex with the lanthanide series rare-earth compound. Illustrative examples include acetylacetone and ketone alcohols.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of solvent, and at a polymerization temperature in a range of generally −30 to +150° C., and preferably 10 to 100° C.

The polybutadiene may be a modified polybutadiene obtained by polymerization using the above-mentioned rare-earth catalyst, followed by the reaction of a terminal modifier with active end groups on the polymer.

A known terminal modifier may be used for this purpose. Illustrative examples include compounds of types (i) to (vii) below.

(i) The modified polybutadiene can be obtained by reacting an alkoxysilyl group-bearing compound with active end groups on the polymer. Preferred alkoxysilyl group-bearing compounds are alkoxysilane compounds having at least one epoxy group or isocyanate group on the molecule. Specific examples include epoxy group-bearing alkoxysilanes such as 3-glycidyloxypropyltrimethoxysilane, 3-glycidyloxypropyltriethoxysilane, (3-glycidyloxypropyl)methyldimethoxysilane, (3-glycidyloxypropyl)methyldiethoxysilane, β-(3,4-epoxycyclohexyl)trimethoxysilane, β-(3,4-epoxycyclohexyl)triethoxysilane, β-(3,4-epoxycyclohexyl)methyldimethoxysilane, β-(3,4-epoxycyclohexyl)ethyldimethoxysilane, condensation products of 3-glycidyloxypropyltrimethoxysilane, and condensation products of (3-glycidyloxypropyl)methyldimethoxysilane; and isocyanate group-bearing alkoxysilane compounds such as 3-isocyanatopropyltrimethoxysilane, 3-isocyanatopropyltriethoxysilane, (3-isocyanatopropyl)methyldimethoxysilane, (3-isocyanatopropyl)methyldiethoxysilane, condensation products of 3-isocyanatopropyltrimethoxysilane and condensation products of (3-isocyanatopropyl)methyldimethoxysilane.

A Lewis acid can be added to accelerate the reaction when the above alkoxysilyl group-bearing compound is reacted with active end groups. The Lewis acid acts as a catalyst to promote the coupling reaction, thus improving cold flow by the modified polymer and providing a better shelf stability. Examples of suitable Lewis acids include dialkyltin dialkyl malates, dialkyltin dicarboxylates and aluminum trialkoxides.

Other types of terminal modifiers that may be used include:

(ii) halogenated organometallic compounds, halogenated metallic compounds and organometallic compounds of the general formulas $R^5{}_nM'X_{4-n}$, $M'X_4$, $M'X_3$, $R^5{}_nM'(-R^6-COOR^7)_{4-n}$ or $R^5{}_nM'(-R^6-COR^7)_{4-n}$ (wherein $R^5$ and $R^6$ are each independently a hydrocarbon group of 1 to 20 carbons; $R^7$ is a hydrocarbon group of 1 to 20 carbons which may include a pendant carbonyl or ester group; M' is a tin, silicon, germanium or phosphorus atom; X is a halogen atom; and n is an integer from 0 to 3);

(iii) heterocumulene compounds having on the molecule a Y=C=Z linkage (wherein Y is a carbon, oxygen, nitrogen or sulfur atom; and Z is an oxygen, nitrogen or sulfur atom);

(iv) three-membered heterocyclic compounds containing on the molecule the following bonds

(wherein Y is an oxygen, nitrogen or sulfur atom);

(v) halogenated isocyano compounds;

(vi) carboxylic acids, acid halides, ester compounds, carbonate compounds and acid anhydrides of the formula $R^8-(COOH)_m$, $R^9(COX)_m$, $R^{10}-(COO-R^{11})$, $R^{12}-OCOO-R^{13}$, $R^{14}-(COOCO-R^{15})_m$ or

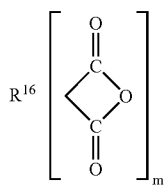

(wherein $R^8$ to $R^{16}$ are each independently a hydrocarbon group of 1 to 50 carbons, X is a halogen atom, and m is an integer from 1 to 5); and (vii) carboxylic acid metal salts of the formula $R^{17}{}_lM''(OCOR^{18})_{4-l}$, $R^{19}{}_lM''(OCO-R^{20}-COOR^{21})_{4-l}$ or

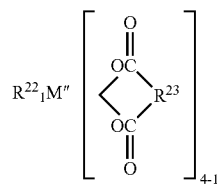

(wherein $R^{17}$ to $R^{23}$ are each independently a hydrocarbon group of 1 to 20 carbons, M'' is a tin, silicon or germanium atom, and the letter l is an integer from 0 to 3).

Specific examples of the above terminal modifiers (i) to (vii) and methods for their reaction are described in, for example, JP-A 11-35633, JP-A 7-268132 and JP-A 2002-293996.

It is critical for the above-described polybutadiene to be included within the base rubber in an amount of at least 60 wt %, preferably at least 70 wt %, more preferably at least 80 wt %, and most preferably at least 90 wt %, and up to 100 wt %, preferably up to 98 wt %, and more preferably up to 95 wt %. If the amount of the above polybutadiene included is too small, a golf ball endowed with a good rebound will be difficult to obtain.

Rubbers other than the above polybutadiene may also be used and included, insofar as the objects of the invention are attainable. Specific examples include polybutadiene rubbers (BR), styrene-butadiene rubbers (SBR), natural rubbers, polyisoprene rubbers and ethylene-propylene-diene rubbers (EPDM). These may be used individually or as combinations of two or more thereof.

The hot-molded material serving as the solid core is molded from a rubber composition which includes as essential components specific amounts of an unsaturated carboxylic acid or a metal salt thereof, an organosulfur compound, an inorganic filler and an antioxidant per 100 parts by weight of the above-described base rubber.

Specific examples of the unsaturated carboxylic acid include acrylic acid, methacrylic acid, maleic acid and fumaric acid. Acrylic acid and methacrylic acid are especially preferred.

Illustrative examples of the metal salt of the unsaturated carboxylic acid include the zinc and magnesium salts of unsaturated fatty acids such as zinc methacrylate and zinc acrylate. The use of zinc acrylate is especially preferred.

The above unsaturated carboxylic acid and/or metal salt thereof are included in an amount per 100 parts by weight of the base rubber of preferably at least 30 parts by weight, more preferably at least 31 parts by weight, even more preferably at least 32 parts by weight, and most preferably at least 33 parts by weight, but preferably not more than 45 parts by weight, more preferably not more than 43 parts by weight, even more preferably not more than 41 parts by weight, and most preferably not more than 40 parts by weight. Too much unsaturated carboxylic acid component will make the core too hard, giving the golf ball an unpleasant feel on impact. On the other hand, too little will result in a lower rebound.

The organosulfur compound is an essential ingredient for imparting a good resilience. Specifically, it is recommended that a thiophenol, thionaphthol or halogenated thiophenol, or a metal salt thereof, be included. Illustrative examples include pentachlorothiophenol, pentafluorothiophenol, pentabromothiophenol, p-chlorothiophenol, the zinc salt of pentachlorothiophenol; and diphenylpolysulfides, dibenzylpolysulfides, dibenzoylpolysulfides, dibenzothiazoylpolysulfides and dithiobenzoylpolysulfides having 2 to 4 sulfurs. Diphenyldisulfide and the zinc salt of pentachlorothiophenol are especially preferred.

The amount of the organosulfur compound included per 100 parts by weight of the base rubber is at least 0.1 part by weight, preferably at least 0.2 part by weight, more preferably at least 0.3 part by weight, even more preferably at least 0.4 part by weight, and most preferably at least 0.7 part by weight, but not more than 5 parts by weight, preferably not more than 4 parts by weight, more preferably not more than 3 parts by weight, even more preferably not more than 2 parts by weight, and most preferably not more than 1.5 parts by weight. Too much organosulfur compound makes the core too soft, whereas too little makes an improvement in resilience unlikely.

Illustrative examples of the inorganic filler include zinc oxide, barium sulfate and calcium carbonate. The amount included per 100 parts by weight of the base rubber is preferably at least 5 parts by weight, more preferably at least 6 parts by weight, even more preferably at least 7 parts by weight, and most preferably at least 8 parts by weight, but preferably not more than 80 parts by weight, more preferably not more than 60 parts by weight, even more preferably not more than 40 parts by weight, and most preferably not more than 20 parts by weight. Too much or too little inorganic filler will make it impossible to obtain a proper golf ball weight and a suitable rebound.

The organic peroxide may be a commercially available product, suitable examples of which include those produced under the trade name designations Percumyl D (NOF Corporation), Perhexa 3M (NOF Corporation), Perhexa C (NOF Corporation), and Luperco 231XL (Atochem Co.). The use of Perhexa 3M or Perhexa C is preferred.

This organic peroxide may be of one type or a mixture of two or more types. The admixture of two or more different organic peroxides is desirable for further enhancing the resilience.

The amount of organic peroxide per 100 parts by weight of the base rubber is preferably at least 0.1 part by weight, more preferably at least 0.2 part by weight, even more preferably at least 0.3 part by weight, and most preferably at least 0.4 part by weight, but preferably not more than 1.0 part by weight, more preferably not more than 0.8 part by weight, even more preferably not more than 0.6 part by weight, yet more preferably not more than 0.5 part by weight, and most preferably not more than 0.45 part by weight. Too much or too little organic peroxide may make it impossible to obtain a suitable hardness distribution and, in turn, a good feel on impact, durability and rebound.

In the present invention, it is critical to include an antioxidant. By including a suitable amount of an antioxidant, it is possible to produce a core having a distinctive core hardness distribution in which an intermediate region inside the core has the greatest hardness. Examples of suitable commercial antioxidants include Nocrac NS-6, Nocrac NS-30 (both available from Ouchi Shinko Chemical Industry Co., Ltd.), and Yoshinox 425 (available from Yoshitomi Pharmaceutical Industries, Ltd.).

To achieve a good rebound and durability, it is recommended that the amount of antioxidant included per 100 parts by weight of the base rubber be at least 0.2 part by weight, preferably at least 0.23 part by weight, more preferably at least 0.25 part by weight, even more preferably at least 0.27 part by weight, and most preferably at least 0.3 part by weight, but not more than 1 part by weight, preferably not more than 0.8 part by weight, more preferably not more than 0.7 part by weight, and most preferably not more than 0.6 part by weight.

The solid core (hot-molded material) may be obtained by vulcanizing and curing the above-described rubber composition by a method similar to that used for known golf ball rubber compositions. Vulcanization may be carried out, for example, at a temperature of from 100 to 200° C. for a period of 10 to 40 minutes. In this case, to obtain the desired crosslinked rubber core of the invention, it is preferable for the vulcanization temperature to be at least 150° C., and especially at least 155° C., but not more than 200° C., preferably not more than 190° C., even more preferably not more than 180° C., and most preferably not more than 170° C.

The solid core has a deformation, when compressed under a final load of 130 kgf from an initial load of 10 kgf, of at least 2.0 mm, preferably at least 2.2 mm, more preferably at least 2.4 mm, and most preferably at least 2.6 mm, but not more than 4.0 mm, preferably not more than 3.4 mm, more preferably not more than 3.3 mm, even more preferably not more than 3.2 mm, and most preferably not more than 3.0 mm. If the solid core has too small a deformation, the feel of the ball on impact will worsen and the ball will take on too much spin, particularly on long shots taken with a club such as a driver in which the ball undergoes large deformation. On the other hand, a solid core that is too soft deadens the feel of the ball when played, compromises the rebound of the ball, resulting in a shorter distance, and gives the ball a poor durability to cracking with repeated impact.

In the invention, the solid core has the hardness distribution shown in the following table.

TABLE 2

| Hardness Distribution in Solid Core | Shore D hardness |
|---|---|
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q) − (S)] | 1 to 10 |
| Hardness difference [(S) − (R)] | 3 to 10 |

The solid core has a center hardness, in Shore D hardness units, of at least 30, preferably at least 33, more preferably at least 35, and most preferably at least 37, but not more than 48, preferably not more than 45, more preferably not more than 43, and most preferably not more than 41.

The solid core has a hardness in the region thereof located 4 mm from the core center, in Shore D hardness units, of at least 34, preferably at least 37, more preferably at least 39, and most preferably at least 41, but not more than 52, preferably not more than 49, more preferably not more than 47, and most preferably not more than 45.

The solid core has a hardness in the region thereof located 8 mm from the core center, in Shore D hardness units, of at least 40, preferably at least 43, more preferably at least 45, and most preferably at least 47, but not more than 58, preferably not more than 55, more preferably not more than 53, and most preferably not more than 51.

The solid core has a hardness in the region thereof located 12 mm from the core center, in Shore D hardness units, of at least 43, preferably at least 46, more preferably at least 48, and most preferably at least 50, but not more than 61, preferably not more than 58, more preferably not more than 56, and most preferably not more than 54.

The solid core has a hardness in the region thereof located 2 to 3 mm inside of the core surface, in Shore D hardness units, of at least 36, preferably at least 39, more preferably at least 41, and most preferably at least 43, but not more than 54, preferably not more than 51, more preferably not more than 49, and most preferably not more than 47.

The solid core has a hardness at the surface, in Shore D hardness units, of at least 41, preferably at least 44, more preferably at least 46, and most preferably at least 48, but not more than 59, preferably not more than 56, even more preferably not more than 54, and most preferably not more than 52. If this Shore D hardness is too low, the rebound of the ball may decrease. On the other hand, if it is too high, the feel on impact may be too hard, in addition to which the spin rate on shots taken with a driver may increase, which may result in a shorter distance.

If the Shore D hardnesses in the core cross-section and the Shore D hardness at the core surface are too low, the rebound will decrease. On the hand, if these hardnesses are too high, the ball will have an excessively hard feel on impact, in addition to which the spin rate on shots with a driver will increase, shortening the distance traveled by the ball.

It is recommended that the hardness difference between the surface and center of the solid core, in Shore D hardness units, be at least 7, preferably at least 8, and most preferably at least 9, but not more than 17, preferably not more than 15, more preferably not more than 14, and most preferably not more than 12. At a hardness difference smaller than the foregoing range, the spin rate on shots taken with a driver will increase and the distance traveled by the ball will decrease. Conversely, at a hardness difference larger than the above-indicated range, the rebound and durability of the ball will decrease.

To enhance the rebound of the ball from suitable ball deformation on shots with a driver at low head speeds, and to improve both the feel on impact and the scuff resistance of the ball, the Shore D hardness difference between the hardness (Q) at the region located 12 mm from the center of the solid core and the hardness (S) at the surface of the core, expressed as (Q)-(S), is at least 1, preferably at least 1.2, more preferably at least 1.5, and most preferably at least 1.7, but not more than 10, preferably not more than 8, more preferably not more than 6, and most preferably not more than 4.

To enhance the rebound of the ball from suitable ball deformation on shots with a driver at low head speeds, and to improve both the feel on impact and the scuff resistance of the ball, the Shore D hardness difference between the hardness (S) at the surface of the solid core and the hardness (R) of the core 2 to 3 mm inside the core surface, expressed as (S)-(R), is at least 3, preferably at least 3.5, and more preferably at least 4, but not more than 10, preferably not more than 8, more preferably not more than 7, and most preferably not more than 6.

It is recommended that the solid core have a diameter of preferably at least 31 mm, more preferably at least 32 mm, even more preferably at least 33 mm, and most preferably at least 34 mm, but preferably not more than 40 mm, more preferably not more than 39 mm, even more preferably not more than 38 mm, yet more preferably not more than 37 mm, and most preferably not more than 36 mm.

It is recommended that the solid core have a specific gravity of at least 0.9, preferably at least 1.0, and more preferably at least 1.1, but not more than 1.4, preferably not more than 1.3, and even more preferably not more than 1.2.

Next, the intermediate layer used in the present invention is described. The intermediate layer used in the invention is formed as a single layer or as two or more layers, and is interposed between the core and the subsequently described cover layer.

The primary material making up the intermediate layer in the invention is not subject to any particular limitation; suitable use may be made of various resin materials. However, it is especially preferable to use a material which includes as an essential component a base resin composed of, in admixture, specific amounts of (a) an olefin-unsaturated carboxylic acid random copolymer and/or a metal ion neutralization product of an olefin-unsaturated carboxylic acid random copolymer and (b) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer. That is, in the present invention, by using the material described below as the preferred material in the intermediate layer, the spin rate on shots with a W#1 can be lowered, enabling a longer distance to be achieved.

The olefin in the above base resin, whether in component (a) or component (b), has a number of carbons which is preferably at least 2 but preferably not more than 8, and more preferably not more than 6. Specific examples include ethylene, propylene, butene, pentene, hexene, heptene and octene. Ethylene is especially preferred.

Examples of unsaturated carboxylic acids include acrylic acid, methacrylic acid, maleic acid and fumaric acid. Acrylic acid and methacrylic acid are especially preferred.

Moreover, the unsaturated carboxylic acid ester is preferably a lower alkyl ester of the above unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The olefin-unsaturated carboxylic acid random copolymer of component (a) and the olefin-unsaturated carboxylic acid-unsaturated carboxylic acid ester random terpolymer of component (b) (the copolymers in components (a) and (b) are referred to collectively below as "random copolymers") can each be obtained by preparing the above-mentioned materials and carrying out random copolymerization by a known method.

It is recommended that the above random copolymers have unsaturated carboxylic acid contents (acid contents) that are controlled. Here, it is recommended that the content of unsaturated carboxylic acid present in the random copolymer serving as component (a) be preferably at least 4 wt %, more preferably at least 6 wt %, even more preferably at least 8 wt %, and most preferably at least 10 wt %, but preferably not more than 30 wt %, more preferably not more than 20 wt %, even more preferably not more than 18 wt %, and most preferably not more than 15 wt %.

Similarly, it is recommended that the content of unsaturated carboxylic acid present in the random copolymer serving as component (b) be preferably at least 4 wt %, more preferably at least 6 wt %, and even more preferably at least 8 wt %, but preferably not more than 15 wt %, more preferably not more than 12 wt %, and even more preferably not more than 10 wt %. If the acid content of the random copolymer is too low, the resilience may decrease, whereas if it is too high, the processability of the intermediate layer-forming resin material may decrease.

The metal ion neutralization product of the olefin-unsaturated carboxylic acid random copolymer of component (a) and the metal ion neutralization product of the olefin-unsaturated carboxylic acid-unsaturated carboxylic acid ester random terpolymer of component (b) (the metal ion neutralization products of the copolymers in components (a) and (b) are referred to collectively below as "metal ion neutralization products of the random copolymers") can be obtained by neutralizing some of the acid groups on the random copolymers with metal ions.

Illustrative examples of metal ions for neutralizing the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, preferred use can be made of, for example, $Na^+$, $Li^+$, $Zn^{++}$ and $Mg^{++}$. To improve resilience, the use of $Na^+$ is even more preferred.

The above metal ion neutralization products of the random copolymers may be obtained by neutralizing the random copolymers with the foregoing metal ions. For example, use may be made of a method in which neutralization is carried out with a compound such as a formate, acetate, nitrate, carbonate, bicarbonate, oxide, hydroxide or alkoxide of the above-mentioned metal ions. No particular limitation is imposed on the degree of neutralization of the random copolymer by these metal ions.

Sodium ion-neutralized ionomer resins may be suitably used as the above metal ion neutralization products of the random copolymers to increase the melt flow rate of the material. Adjustment of the material to the subsequently described optimal melt flow rate is thus easy, enabling the moldability to be improved.

Commercially available products may be used as the base resins of above components (a) and (b). Illustrative examples of the random copolymer in component (a) include Nucrel 1560, Nucrel 1214 and Nucrel 1035 (all products of DuPont-Mitsui Polychemicals Co., Ltd.), and Escor 5200, Escor 5100 and Escor 5000 (all products of ExxonMobil Chemical). Illustrative examples of the random copolymer in component (b) include Nucrel AN4311 and Nucrel AN4318 (both products of DuPont-Mitsui Polychemicals Co., Ltd.), and Escor ATX325, Escor ATX320 and Escor ATX310 (all products of ExxonMobil Chemical).

Illustrative examples of the metal ion neutralization product of the random copolymer in component (a) include Himilan 1554, Himilan 1557, Himilan 1601, Himilan 1605, Himilan 1706 and Himilan AM7311 (all products of DuPont-Mitsui Polychemicals Co., Ltd.), Surlyn 7930 (E. I. DuPont de Nemours & Co.), and Iotek 3110 and Iotek 4200 (both products of ExxonMobil Chemical). Illustrative examples of the metal ion neutralization product of the random copolymer in component (b) include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E. I. DuPont de Nemours & Co.), and Iotek 7510 and Iotek 7520 (both products of ExxonMobil Chemical). Sodium-neutralized ionomer resins that are suitable as the metal ion neutralization product of the random copolymer include Himilan 1605, Himilan 1601 and Himilan 1555.

When preparing the above-described base resin, component (a) and component (b) are admixed in a weight ratio of generally between 100:0 and 0:100, preferably between 100:0 and 25:75, more preferably between 100:0 and 50:50, even more preferably between 100:0 and 75:25, and most preferably 100:0. If too little component (a) is included, the molded material obtained therefrom may have a decreased resilience.

In addition, the processability of the base resin can be further improved by also adjusting the ratio in which the random copolymers and the metal ion neutralization products of the random copolymers are admixed when preparing the base resin as described above. It is recommended that the weight ratio of the random copolymers to the metal ion neutralization products of the random copolymers be between 0:100 and 60:40, preferably between 0:100 and 40:60, more preferably between 0:100 and 20:80, and even more preferably 0:100. The addition of too much random copolymer may lower the processability during mixing.

Component (e) described below may be added to the base resin. Component (e) is a non-ionomeric thermoplastic elastomer. The purpose of this component is to further improve the feel of the ball on impact and the rebound. Examples include olefin elastomers, styrene elastomers, polyester elastomers, urethane elastomers and polyamide elastomers. To further increase the rebound, it is preferable to use a polyester elastomer or an olefin elastomer. The use of an olefin elastomer composed of a thermoplastic block copolymer which includes crystalline polyethylene blocks as the hard segments is especially preferred.

A commercially available product may be used as component (e). Illustrative examples include Dynaron (JSR Corporation) and the polyester elastomer Hytrel (DuPont-Toray Co., Ltd.).

It is recommended that component (e) be included in an amount, per 100 parts by weight of the base resin of the invention, of preferably at least 0 part by weight, more preferably at least 5 parts by weight, even more preferably at least 10 parts by weight, and most preferably at least 20 parts by weight, but preferably not more than 100 parts by weight, more preferably not more than 60 parts by weight, even more preferably not more than 50 parts by weight, and most preferably not more than 40 parts by weight. Too much component (e) will lower the compatibility of the mixture, possibly resulting in a substantial decline in the durability of the golf ball.

Next, component (c) described below may be added to the base resin. Component (c) is a fatty acid or fatty acid derivative having a molecular weight of at least 228 but not more than 1500. Compared with the base resin, this component has a very low molecular weight and, by suitably adjusting the melt viscosity of the mixture, helps in particular to improve the flow properties. Component (c) includes a relatively high content of acid groups (or derivatives thereof), and is capable of suppressing an excessive loss in resilience.

The fatty acid or fatty acid derivative of component (c) has a molecular weight of at least 228, preferably at least 256, more preferably at least 280, and even more preferably at least 300, but not more than 1500, preferably not more than 1000, even more preferably not more than 600, and most preferably not more than 500. If the molecular weight is too low, the heat resistance cannot be improved. On the other hand, if the molecular weight is too high, the flow properties cannot be improved.

The fatty acid or fatty acid derivative of component (c) may be an unsaturated fatty acid (or derivative thereof) containing a double bond or triple bond on the alkyl moiety, or it may be a saturated fatty acid (or derivative thereof) in which the bonds on the alkyl moiety are all single bonds. It is recommended that the number of carbons on the molecule be preferably at least 18, more preferably at least 20, even more preferably at least 22, and most preferably at least 24, but preferably not more than 80, more preferably not more than 60, even more preferably not more than 40, and most preferably not more than 30. Too few carbons may make it impossible to improve the heat resistance and may also make the acid group content so high as to diminish the flow-improving effect due to interactions with acid groups present in the base resin. On the other hand, too many carbons increases the molecular weight, which may keep a distinct flow-improving effect from appearing.

Specific examples of the fatty acid of component (c) include myristic acid, palmitic acid, stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred. Behenic acid is especially preferred.

The fatty acid derivative of component (c) is exemplified by metallic soaps in which the proton on the acid group of the fatty acid has been replaced with a metal ion. Examples of the metal ion include $Na^+$, $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. Of these, $Ca^{++}$, $Mg^{++}$ and $Zn^{++}$ are especially preferred.

Specific examples of fatty acid derivatives that may be used as component (c) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Component (d) may be added as a basic inorganic metal compound capable of neutralizing acid groups in the base resin and in component (c). If component (d) is not included, when a metal soap-modified ionomer resin (e.g., the metal soap-modified ionomer resins cited in the above-mentioned patent publications) is used alone, the metallic soap and un-neutralized acid groups present on the ionomer resin undergo exchange reactions during mixture under heating, generating a large amount of fatty acid. Because the fatty acid has a low thermal stability and readily vaporizes during molding, it may cause molding defects. Moreover, if the fatty acid thus generated deposits on the surface of the molded material, it may substantially lower paint film adhesion and may have other undesirable effects such as lowering the resilience of the resulting molded material.

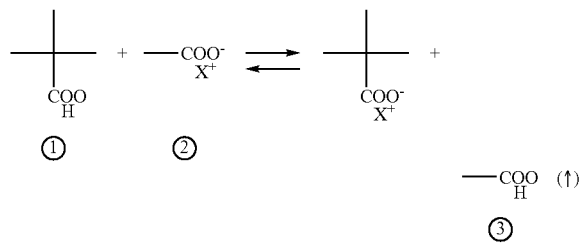

(1) un-neutralized acid group present on the ionomer resin
(2) metallic soap
(3) fatty acid
X: metal cation Accordingly, to solve this problem, the intermediate layer-forming resin material includes also, as an essential component, a basic inorganic metal compound (d) which neutralizes the acid groups present in the base resin and component (c), in this way improving the resilience of the molded material.

That is, by including component (d) as an essential ingredient in the material, not only are the acid groups in the base resin and component (c) neutralized, through synergistic effects from the optimal addition of each of these components it is possible as well to increase the thermal stability of the mixture and give it a good moldability, and also to enhance the resilience.

Here, it is recommended that the basic inorganic metal compound used as component (d) be a compound which has a high reactivity with the base resin and contains no organic acids in the reaction by-products, thus enabling the degree of neutralization of the mixture to be increased without a loss of thermal stability.

Illustrative examples of the metal ion in the basic inorganic metal compound serving as component (d) include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. Known basic inorganic fillers containing these metal ions may be used as the basic inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. In particular, a hydroxide or a monoxide is recommended. Calcium hydroxide and magnesium oxide, which have a high reactivity with the base resin, are more preferred. Calcium hydroxide is especially preferred.

Because the above-described resin material is arrived at by blending specific respective amounts of components (c) and (d) with the resin component, i.e., the base resin containing specific respective amounts of components (a) and (b) in combination with optional component (e), this material has excellent thermal stability, flow properties and moldability, and can impart the molded material with a markedly improved resilience.

Components (c) and (d) are included in respective amounts, per 100 parts by weight of the resin component suitably formulated from components (a), (b) and (e), of at least 5 parts by weight, preferably at least 10 parts by weight, more preferably at least 15 parts by weight, and even more preferably at least 18 parts by weight, but not more than 80 parts by weight, preferably not more than 40 parts by weight, more preferably not more than 25 parts by weight, and even more preferably not more than 22 parts by weight, of component (c); and at least 0.1 part by weight, preferably at least 0.5 part by weight, more preferably at least 1 part by weight, and even more preferably at least 2 parts by weight, but not more than 17 parts by weight, preferably not more than 15 parts by weight, more preferably not more than 13 parts by weight, and even more preferably not more than 10 parts by weight, of component (d). Too little component (c) lowers the melt viscosity, resulting in inferior processability, whereas too much lowers the durability. Too little component (d) fails to improve thermal stability and resilience, whereas too much instead lowers the heat resistance of the golf ball-forming material due to the presence of excess basic inorganic metal compound.

In the above-described resin material formulated from the respective above-indicated amounts of the resin component and components (c) and (d), it is recommended that preferably at least 50 mol %, more preferably at least 60 mol %, even more preferably at least 70 mol %, and most preferably at least 80 mol %, of the acid groups be neutralized. Such a high degree of neutralization makes it possible to more reliably suppress the exchange reactions that cause trouble when only a base resin and a fatty acid or fatty acid derivative are used as in the above-cited prior art, thus preventing the generation of fatty acid. As a result, there is obtained a resin material of substantially improved thermal stability and good processability which can provide molded products of much better resilience than prior-art ionomer resins.

"Degree of neutralization," as used above, refers to the degree of neutralization of acid groups present within the mixture of the base resin and the fatty acid or fatty acid derivative serving as component (c), and differs from the degree of neutralization of the ionomer resin itself when an ionomer resin is used as the metal ion neutralization product of a random copolymer in the base resin. A mixture according to the invention having a certain degree of neutralization, when compared with an ionomer resin alone having the same degree of neutralization, contains a very large number of metal ions. This large number of metal ions increases the density of ionic crosslinks which contribute to improved resilience, making it possible to confer the molded product with excellent resilience.

To more reliably achieve a material having both a high degree of neutralization and good flow properties, it is recommended that the acid groups in the above-described mixture be neutralized with transition metal ions and with alkali metal and/or alkaline earth metal ions. Although neutralization with transition metal ions results in a weaker ionic cohesion than neutralization with alkali metal and alkaline earth metal ions, by using these different types of ions together to neutralize acid groups in the mixture, a substantial improvement can be made in the flow properties.

It is recommended that the molar ratio between the transition metal ions and the alkali metal and/or alkaline earth metal ions be in a range of typically 10:90 to 90:10, preferably 20:80 to 80:20, more preferably 30:70 to 70:30, and even more preferably 40:60 to 60:40. Too low a molar ratio of transition metal ions may fail to provide a sufficient flow-improving effect. On the other hand, a transition metal ion molar ratio which is too high may lower the resilience.

Examples of the metal ions include, but are not limited to, zinc ions as the transition metal ions and at least one type of ion selected from among sodium, lithium and magnesium ions as the alkali metal or alkaline earth metal ions.

A known method may be used to obtain a mixture in which the desired amount of acid groups have been neutralized with transition metal ions and alkali metal or alkaline earth metal ions. Specific examples of methods of neutralization with transition metal ions, particularly zinc ions, include a method which uses a zinc soap as the fatty acid derivative, a method which uses a zinc ion neutralization product (e.g., a zinc ion-neutralized ionomer resin) when formulating components (a) and (b) as the base resin, and a method which uses a zinc compound such as zinc oxide as the basic inorganic metal compound of component (d).

The resin material should preferably have a melt flow rate adjusted to ensure flow properties that are particularly suitable for injection molding, and thus improve moldability. Specifically, it is recommended that the melt flow rate (MFR), as measured according to JIS-K7210 at a temperature of 190° C. and under a load of 21.18 N (2.16 kgf), be set to preferably at least 0.6 dg/min, more preferably at least 0.7 dg/min, even more preferably at least 0.8 dg/min, and most preferably at least 2 dg/min, but preferably not more than 20 dg/min, more preferably not more than 10 dg/min, even more preferably not more than 5 dg/min, and most preferably not more than 3 dg/min. Too high or low a melt flow rate may result in a substantial decline in processability.

Illustrative examples of the intermediate layer material include those having the trade names HPF 1000, HPF 2000, HPF AD1027, HPF AD1035 and HPF AD1040, as well as the experimental material HPF SEP1264-3, all produced by E. I. DuPont de Nemours & Co.

At least one intermediate layer has a surface hardness, in Shore D hardness units, of at least 40, preferably at least 42, more preferably at least 45, and even more preferably at least 47, but not more than 60, preferably not more than 57, more preferably not more than 54, and even more preferably not more than 51. If the surface hardness of the intermediate layer is too low, the resilience will decrease, resulting in an increased spin rate and thus a decline in the distance traveled by the ball. On the other hand, if the surface hardness of the intermediate layer is too high, the feel of the ball on impact will worsen and the durability of the ball to cracking will decrease. As used herein, "Shore D" is a measured value obtained with a type D durometer in accordance with ASTM D2240.

From the standpoint of the spin properties on shots taken with a driver, the surface hardness of the intermediate layer and the surface hardness of the core have a difference therebetween of preferably 5 or less, more preferably 4 or less, and even more preferably 3 or less.

The intermediate layer or layers have a total thickness of at least 0.9 mm, preferably at least 1.1 mm, more preferably at least 1.4 mm, even more preferably at least 1.7 mm, and most preferably at least 2.0 mm. The total thickness of the intermediate layer or layers is not more than 7.0 mm, preferably not more than 6.0 mm, even more preferably not more than 5.0 mm, and most preferably not more than 4.0 mm. If the total thickness of the intermediate layer or layers is too low, the spin rate of the ball when struck with a W#1 increases and the rebound decreases, shortening the distance traveled by the ball, in addition to which the ball has a hard feel on impact.

The intermediate layer in the inventive golf ball may be formed using a known method, such as by injection-molding directly over the core, or by covering the core with two half-cups that have been molded beforehand as hemispherical shells, then molding under applied heat and pressure.

To ensure good adhesion between the cover layer and the intermediate layer, and also good durability, it is desirable to treat the surface of the intermediate layer with a primer. Specifically, an adhesive layer may be provided between the intermediate layer and the cover layer in order to enhance the durability of the ball when struck. Examples of adhesives suitable for this purpose include epoxy resin adhesives, vinyl resin adhesives, and rubber adhesives. The use of a urethane resin adhesive or a chlorinated polyolefin adhesive is especially preferred.

The adhesive layer may be formed by dispersion coating. No particular limitation is imposed on the type of emulsion used for dispersion coating. The resin powder used for preparing the emulsion may be a thermoplastic resin powder or a thermoset resin powder. Illustrative examples of suitable resins include vinyl acetate resins, vinyl acetate copolymer resins, ethylene-vinyl acetate (EVA) copolymer resins, acrylate polymer or copolymer resins, epoxy resins, thermoset urethane resins, and thermoplastic urethane resins. Of these, epoxy resins, thermoset urethane resins, thermoplastic urethane resins and acrylate polymer or copolymer resins are preferred. A thermoplastic urethane resin is especially preferred.

The adhesive layer has a thickness of preferably 0.1 to 30 μm, more preferably 0.2 to 25 μm, and especially 0.3 to 20 μm.

In the practice of the invention, the cover layer is formed primarily of a polyurethane material, especially a thermoplastic or thermoset polyurethane material. By forming a solid golf ball in which the cover layer is composed primarily of such a polyurethane material, it is possible to achieve an excellent feel, controllability, cut resistance, scuff resistance and durability to cracking on repeated impact without a loss of rebound. The cover may be composed of a single layer or may have a multilayer construction of two or more layers, in which case it is critical for the outermost layer of the cover to be composed primarily of the thermoplastic or thermoset polyurethane material described here.

With regard to the resin material making up the cover layer, while not subject to any particular limitation, the cover layer is preferably made of a molded resin blend composed primarily of (A) a thermoplastic polyurethane and (B) a polyisocyanate compound. By forming the cover layer using such a polyurethane material as a primary component therein, an excellent feel, controllability, cut resistance, scuff resistance and durability to cracking on repeated impact can be achieved without a loss of resilience.

To fully exhibit the advantageous effects of the invention, a necessary and sufficient amount of unreacted isocyanate groups should be present in the cover resin material. Specifically, it is recommended that the above components A and B have a combined weight which is at least 60%, and preferably at least 70%, of the total weight of the cover layer. Components A and B are described in detail below.

The thermoplastic polyurethane serving as component A has a structure which includes soft segments made of a polymeric polyol that is a long-chain polyol (polymeric glycol), and hard segments made of a chain extender and a polyisocyanate compound. Here, the long-chain polyol used as a starting material is not subject to any particular limitation, and may be any that is used in the prior art relating to thermoplastic polyurethanes. Exemplary long-chain polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly or as combinations of two or more thereof. Of the long-chain polyols mentioned here, polyether polyols are preferred because they enable the synthesis of thermoplastic polyurethanes having a high rebound resilience and excellent low-temperature properties.

Illustrative examples of the above polyether polyol include poly(ethylene glycol), poly(propylene glycol), poly(tetramethylene glycol) and poly(methyltetramethylene glycol) obtained by the ring-opening polymerization of a cyclic ether. The polyether polyol may be used singly or as a combination of two or more thereof. Of these, poly(tetramethylene glycol) and/or poly(methyltetramethylene glycol) are preferred.

It is preferable for these long-chain polyols to have a number-average molecular weight in a range of 1,500 to 5,000. By using a long-chain polyol having a number-average molecular weight within this range, golf balls made of a thermoplastic polyurethane composition having excellent properties such as resilience and manufacturability can be reliably obtained. The number-average molecular weight of the long-chain polyol is more preferably in a range of 1,700 to 4,000, and even more preferably in a range of 1,900 to 3,000.

As used herein, "number-average molecular weight of the long-chain polyol" refers to the number-average molecular weight computed based on the hydroxyl number measured in accordance with JIS K-1557.

Suitable chain extenders include those used in the prior art relating to thermoplastic polyurethanes. For example, low-molecular-weight compounds which have a molecular weight of 400 or less and bear on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these chain extenders, aliphatic diols having 2 to 12 carbons are preferred, and 1,4-butylene glycol is especially preferred.

The polyisocyanate compound is not subject to any particular limitation, although preferred use may be made of a polyisocyanate compound employed in the prior art relating to thermoplastic polyurethanes. Specific examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane serving as above component A to be a thermoplastic polyurethane synthesized using a polyether polyol as the long-chain polyol, using an aliphatic diol as the chain extender, and using an aromatic diisocyanate as the polyisocyanate compound. It is desirable, though not essential, for the polyether polyol to be a polytetramethylene glycol having a number-average molecular weight of at least 1,900, for the chain extender to be 1,4-butylene glycol, and for the aromatic diisocyanate to be 4,4'-diphenylmethane diisocyanate.

The mixing ratio of activated hydrogen atoms to isocyanate groups in the above polyurethane-forming reaction can be controlled within a desirable range so as to make it possible to obtain a golf ball which is composed of a thermoplastic polyurethane composition and has various improved properties, such as rebound, spin performance, scuff resistance and manufacturability. Specifically, in preparing a thermoplastic polyurethane by reacting the above long-chain polyol, polyisocyanate compound and chain extender, it is desirable to use the respective components in proportions such that the amount of isocyanate groups on the polyisocyanate compound per mole of active hydrogen atoms on the long-chain polyol and the chain extender is from 0.95 to 1.05 moles.

No particular limitation is imposed on the method of preparing the thermoplastic polyurethane used as component A. Production may be carried out by either a prepolymer process or one-shot process in which the long-chain polyol, chain extender and polyisocyanate compound are used and a known urethane-forming reaction is effected. Of these, a process in which melt polymerization is carried out in a substantially solvent-free state is preferred. Production by continuous melt polymerization using a multiple screw extruder is especially preferred.

Illustrative examples of the thermoplastic polyurethane serving as component A include commercial products such as Pandex T8295, Pandex T8290 and Pandex T8260 (all available from DIC Bayer Polymer, Ltd.).

Next, concerning the polyisocyanate compound used as component B, it is critical that, in at least some of the polyisocyanate compound in the single resin blend, all the isocyanate groups on the molecule remain in an unreacted state. That is, polyisocyanate compound in which all the isocyanate groups on the molecule are in a completely free state must be present within the single resin blend, and such a polyisocyanate compound may be present together with polyisocyanate compound in which some of the isocyanate groups on the molecule are in a free state.

Various types of isocyanates may be employed without particular limitation as this polyisocyanate compound. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Of the above group of isocyanates, the use of 4,4'-diphenylmethane diisocyanate, dicyclohexylmethane diisocyanate and isophorone diisocyanate is preferable in terms of the balance between the influence on processability of such effects as the rise in viscosity that accompanies the reaction with the thermoplastic polyurethane serving as component A and the physical properties of the resulting golf ball cover material.

In the practice of the invention, although not an essential constituent, a thermoplastic elastomer other than the above-described thermoplastic polyurethane may be included as component C together with components A and B. Incorporating this component C in the above resin blend enables the fluidity of the resin blend to be further improved and enables increases to be made in various properties required of golf ball cover materials, such as resilience and scuff resistance.

Component C, which is a thermoplastic elastomer other than the above thermoplastic polyurethane, is exemplified by one or more thermoplastic elastomer selected from the group consisting of polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. The use of a polyester elastomer, a polyamide elastomer or a polyacetal is especially preferred for such reasons as enhancing the resilience and scuff resistance owing to reactions with isocyanate groups, while retaining a good manufacturability.

The relative proportions of above components A, B and C are not subject to any particular limitation, although to fully achieve the advantageous effects of the invention, it is preferable for the weight ratio A:B:C of the respective components to be from 100:{2 to 50}:{0 to 50}, and more preferably from 100:{2 to 30}:{8 to 50}.

In the practice of the invention, the resin blend is prepared by mixing component A with component B, and additionally mixing also component C. It is critical to select the mixing conditions such that, of the polyisocyanate compound, at least some polyisocyanate compound is present in which all the isocyanate groups on the molecule remain in an unreacted state. For example, treatment such as mixture in an inert gas (e.g., nitrogen) or in a vacuum state must be furnished. The resin blend is then injection-molded around a core which has been placed in a mold. To smoothly and easily handle the resin blend, it is preferable for the blend to be formed into pellets having a length of 1 to 10 mm and a diameter of 0.5 to 5 mm. Isocyanate groups in an unreacted state remain in these resin pellets; while the resin blend is being injection-molded about the core, or due to post-treatment such as annealing, the unreacted isocyanate groups react with component A or component C to form a crosslinked material.

Various additives other than the ingredients making up the above-described thermoplastic polyurethane may be optionally included in the above resin blend. Additives that may be suitably used include pigments, dispersants, antioxidants, light stabilizers, ultraviolet absorbers and parting agents.

The melt mass flow rate (MFR) at 210° C. of the resin blend is not subject to any particular limitation. However, to increase the flow properties and manufacturability, the MFR is preferably at least 5 g/10 min, and more preferably at least 6 g/10 min. Too low a melt mass flow rate reduces the fluidity, which may cause eccentricity during injection molding and may also lower the degree of freedom in the moldable cover thickness. The measured value of the melt mass flow rate is obtained in accordance with JIS-K7210 (1999 edition).

The above method of molding the cover layer is exemplified by feeding the above resin blend to an injection molding machine, and injecting the molten resin blend around the core so as to form a cover layer. The molding temperature varies according to such factors as the type of thermoplastic polyurethane, but is typically in a range of 150 to 250° C.

When injection molding is carried out, it is desirable though not essential to carry out molding in a low-humidity environment such as by purging with a low-temperature gas (e.g., an inert gas such as nitrogen, or low dew-point dry air) or by vacuum treating some or all places on the resin paths from the resin feed area to the mold interior. Illustrative, non-limiting, examples of the medium used for transporting the resin include low-moisture gases such as low dew-point dry air or nitrogen gas. By carrying out molding in such a low-humidity environment, reaction by the isocyanate groups is kept from proceeding before the resin is charged into the mold interior. As a result, polyisocyanate in which the isocyanate groups are present in an unreacted state is included to some degree in the resin molded part, thus making it possible to reduce variable factors such as unwanted rises in viscosity and enabling the essential crosslinking efficiency to be enhanced.

Techniques that could be used to confirm the presence of polyisocyanate compound in an unreacted state within the resin blend prior to injection molding about the core include those which involve extraction with a suitable solvent that selectively dissolves out only the polyisocyanate compound. An example of a simple and convenient method is one in which confirmation is carried out by simultaneous thermogravimetric and differential thermal analysis (TG-DTA) measurement in an inert atmosphere. For example, when the resin blend (cover material) used in the invention is heated in a nitrogen atmosphere at a temperature ramp-up rate of 10° C./min, a gradual drop in the weight of diphenylmethane diisocyanate can be observed from about 150° C. On the other hand, in a resin sample in which the reaction between the thermoplastic polyurethane material and the isocyanate mixture has been carried out to completion, a weight drop from about 150° C. is not observed, but a weight drop from about 230 to 240° C. can be observed.

After the resin has been molded as described above, its properties as a golf ball cover can be further improved by carrying out annealing so as to induce the crosslinking reaction to proceed further. "Annealing," as used herein, refers to aging the cover in a fixed environment for a fixed length of time.

The cover layer has a hardness at the surface thereof, in Shore D hardness units, of at least 50, preferably at least 53, more preferably at least 56, even more preferably at least 58, and most preferably at least 60, but not more than 70, preferably not more than 68, more preferably not more than 66, and most preferably not more than 65. If the cover is too soft, the ball will have a greater spin receptivity and an inadequate rebound, shortening the distance of travel, in addition to which the cover will have a poor scuff resistance. On the other hand, if the cover is too hard, the durability to cracking with repeated impact will decrease and the feel of the ball during the short game and when hit with a putter will worsen. The Shore D hardness of the cover is the value measured with a type D durometer according to ASTM D2240.

The above-described cover layer has a rebound resilience of generally at least 35%, preferably at least 40%, more preferably at least 45%, and even more preferably at least 47%. Because a thermoplastic polyurethane does not inherently have that good a resilience, strict selection of the rebound resilience is preferable. If the rebound resilience of the cover layer is too low, the distance traveled by the golf ball may dramatically decrease. On the other hand, if the rebound resilience of the cover layer is too high, the initial velocity on shots of under 100 yards that require control and on putts may be too high and the feel of the ball when played may not agree with the golfer. "Rebound resilience" refers herein to the rebound resilience obtained in accordance with JIS K7311. In addition, the cover material has a flexural rigidity which, while not subject to any particular limitation, is preferably at least 50 MPa, more preferably at least 60 MPa, and even more preferably at least 70 MPa, but preferably not more than 300 MPa, more preferably not more than 280 MPa, even more preferably not more than 260 MPa, and most preferably not more than 240 MPa. In this way, there can be obtained a cover material which gives the cover a flexural rigidity that is low relative to its hardness, and which is thus suitable for attaining good spin characteristics and controllability on approach shots.

To achieve the desired spin properties on shots taken with a driver, it is desirable for the core to have a surface hardness which is lower than the surface hardness of the cover. Specifically, the difference between the surface hardness of the core and the surface hardness of the cover in Shore D hardness units, while not subject to any particular limitation, is set to preferably at least 5, more preferably at least 7, even more preferably at least 8, and most preferably at least 10, but typically not more than 20, preferably not more than 19, more preferably not more than 18, and even more preferably not more than 17.

The cover layer has a thickness of at least 0.5 mm, preferably at least 0.7 mm, more preferably at least 0.8 mm, even more preferably at least 0.9 mm, and most preferably at least 1.0 mm, but not more than 1.9 mm, preferably not more than 1.6 mm, more preferably not more than 1.4 mm, and most preferably not more than 1.2 mm. If the cover is too thin, the durability to cracking with repeated impact will worsen and the resin will have difficulty spreading properly through the top portion of the mold during injection molding, which may result in a poor sphericity. On the other hand, if the cover is too thick, the ball will take on increased spin when hit with a number one wood (W#1), lowering the rebound and thus shortening the distance of travel, in addition to which the ball will have too hard a feel on impact.

Numerous dimples are formed on the surface of the golf ball (surface of the cover layer). The number of dimples is preferably at least 250, more preferably at least 270, even more preferably at least 290, and most preferably at least 310, but preferably not more than 420, more preferably not more than 415, even more preferably not more than 410, and most preferably not more than 405. In the invention, within this range, the ball readily undergoes lift and the distance traveled by the ball on shots taken with a driver can be increased. To achieve a suitable trajectory, it is desirable for the dimples to be given a shape that is circular as seen from above. The average dimple diameter is preferably at least 3.7 mm, and more preferably at least 3.75 mm, but preferably not more than 5.0 mm, more preferably not more than 4.7 mm, even more preferably not more than 4.4 mm, and most preferably not more than 4.2 mm. The average dimple depth is preferably at least 0.125 mm, more preferably at least 0.130 mm, even more preferably at least 0.133 mm, and most preferably at least 0.135 mm, but preferably not more than 0.150 mm, more preferably not more than 0.148 mm, even more preferably not more than 0.146 mm, and most preferably not more than 0.144 mm. Moreover, the dimples are composed of preferably at least 4 types, more preferably at least 5 types, and even more preferably at least 6 types, of mutually differing diameter and/or depth. While there is no particular upper limit on the number of dimple types, it is recommended that the number of dimple types be preferably 20 or less, more preferably 15 or less, and most preferably 12 or less.

As used herein, "average depth" refers to the mean value for the depths of all the dimples. The diameter of a dimple is measured as the distance across the dimple between positions where the dimple region meets land areas (non-dimple regions), that is, between the highest points of the dimple region. The golf ball is usually painted, in which case the dimple diameter refers to the diameter when the surface of the ball is covered with paint. The depth of a dimple is measured by connecting together the positions where the dimple meets the surrounding land areas so as to define an imaginary flat plane, and determining the vertical distance from a center position on the flat plane to the bottom (deepest position) of the dimple.

If necessary, the surface of the solid golf ball can be marked, painted and surface treated.

The solid golf ball of the invention has a deformation, when compressed under a final load of 130 kgf from an initial load of 10 kgf, of at least 2.0 mm, preferably at least 2.2 mm, more preferably at least 2.4 mm, and even more preferably at least 2.5 mm, but not more than 3.8 mm, preferably not more than 3.6 mm, more preferably not more than 3.4 mm, and most preferably not more than 3.1 mm.

The solid golf ball of the invention can be produced in accordance with the Rules of Golf for use in competitive play, in which case the ball may be formed to a diameter of not less than 42.67 mm and a weight of not more than 45.93 g. The upper limit for the diameter is generally not more than 44.0 mm, preferably not more than 43.8 mm, more preferably not more than 43.5 mm, and most preferably not more than 43.0 mm. The lower limit for the weight is generally not less than 44.5 g, preferably not less than 45.0 g, more preferably not less than 45.1 g, and even more preferably not less than 45.2 g.

The solid golf ball of the invention can be manufactured using an ordinary process such as a known injection molding process. For example, a molded and vulcanized material composed primarily of the base rubber is placed as the solid core within a specific injection-molding mold, following which a single layer of the cover material is injection-molded over the core to give the golf ball. Alternatively, the solid core may be enclosed within two half-cups that have been molded beforehand as hemispherical shells, and molding subsequently carried out under applied heat and pressure.

As described above, in the solid golf ball of the invention, by optimizing the hardness distribution of the solid core, the selection of the cover material, the hardnesses of the solid core and the cover, and the amount of deflection by the ball as a whole, the rebound can be enhanced even further and the spin rate of the ball can be reduced, especially on full shots with a driver at low head speeds (HS) of from 30 to 40 m/s, increasing the distance traveled by the ball. Also, by having the hardness at the core surface be lower than the hardness at the core interior, a good feel on impact can be achieved. Moreover, compared with an ordinary ionomer cover, the cover has a flexural rigidity that is relatively low for its hardness, resulting in an excellent spin performance on approach shots and a very high spin stability. In addition, the inventive solid golf ball also has an excellent scuff resistance and excellent durability to cracking on repeated impact, making it overall a highly advantageous ball for use in competitive play.

EXAMPLES

The following Examples of the invention and Comparative Examples are provided by way of illustration and not by way of limitation.

Examples 1 to 7, and Comparative Examples 1 to 10

In each example, a solid core was produced by preparing a core composition having one of formulations No. 1 to No. 11 shown in Table 3, then molding and vulcanizing the composition under the vulcanization conditions in Table 3. Next, one or two intermediate layers and a cover layer were formed by injection-molding formulations prepared from the resin ingredients shown in Table 4. In addition, a plurality of dimple types were used in combination, giving a solid golf ball having 330 dimples (Configuration I), 432 dimples (Configuration II), or 500 dimples (Configuration III) on the ball surface.

In the examples of the invention and the comparative examples in which cover formulations d and e were used, the starting materials shown in Table 4 (units: parts by weight) were worked together under a nitrogen gas atmosphere in a twin-screw extruder, thereby giving cover resin blends. These resin blends were in the form of pellets having a length of 3 mm and a diameter of 1 to 2 mm.

In each example, a solid core was placed within an injection-molding mold and covered with an intermediate layer to form a sphere, following which the above cover material was injection-molded over the sphere, thereby giving a multi-piece golf ball. Samples for measuring the physical properties of the cover were prepared by injection-molding a sheet of a specific thickness, annealing the molded sheet for 8 hours at 100° C., then holding the annealed sheet at room temperature for one week.

In Comparative Example 7 in which cover formulation f was used, a sphere composed of a core encased by an intermediate layer was placed within an injection-molding mold and a dry blend of thermoplastic polyurethane pellets with isocyanate mixture pellets was injection-molded over the sphere, thereby giving multi-piece solid golf balls. Subsequent treatment was carried out in the same way as described above. In Comparative Example 8 in which cover formulation g was used, only pellets composed entirely of thermoplastic polyurethane were injection-molded, and annealing was not carried out.

TABLE 3

| | | Formulation No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Core formulations | BR11 | | | | | | | | | | | 100 |
| | BR730 | 100 | 100 | 100 | 100 | 100 | 100 | 100 | 100 | 100 | 100 | |
| | Perhexa C-40 | 0.3 | 0.3 | 0.3 | 0.3 | 0.3 | 0.3 | 0.3 | 0.3 | 0.3 | 0.8 | 0.6 |
| | (true amount added) | 0.12 | 0.12 | 0.12 | 0.12 | 0.12 | 0.12 | 0.12 | 0.12 | 0.12 | 0.32 | 0.24 |
| | Percumyl D | 0.3 | 0.3 | 0.3 | 0.3 | 0.3 | 0.3 | 0.3 | 0.3 | 0.3 | 0.8 | 0.6 |
| | Zinc oxide | 27 | 24.8 | 21.8 | 23.6 | 22.8 | 23.7 | 21.9 | 26 | 24.8 | 24.5 | 23.6 |
| | Antioxidant | 0.3 | 0.6 | 0.4 | 0.3 | 0.3 | 0.3 | 0.3 | 0.3 | 0.1 | 0.3 | 0.3 |
| | Zinc stearate | 5 | 5 | 5 | 5 | 5 | 5 | 5 | 5 | 5 | 5 | 5 |
| | Zinc acrylate | 32 | 38 | 37.5 | 33.5 | 35.5 | 34 | 39.5 | 27.5 | 30.5 | 31 | 33.5 |
| | Zinc salt of pentachloro-thiophenol | 1.5 | 1.5 | 1.5 | 1 | 1 | 0.5 | 0 | 1 | 1 | 1 | 1 |
| Vulcanizing method | Temperature (° C.) | 160 | 160 | 160 | 160 | 145 | 160 | 160 | 160 | 160 | 160 | 160 |
| | Time (min) | 15 | 18 | 16 | 15 | 18 | 15 | 15 | 13 | 13 | 13 | 13 |

Numbers in the "Core formulations" section of the table indicate parts by weight.

Trade names for most of the materials appearing in the table are as follows.

BR11: A polybutadiene rubber produced by JSR Corporation using a nickel catalyst; cis-1,4 bond content, 96%; 1,2-vinyl bond content, 2.0%; Mooney viscosity, 43; Mw/Mn=4.1.

BR730: A polybutadiene rubber produced by JSR Corporation using a neodymium catalyst; cis-1,4 bond content, 96%; 1,2-vinyl bond content, 1.3%; Mooney viscosity, 55; Mw/Mn=3.

Perhexa C-40: 1,1-Bis(t-butylperoxy)cyclohexane, 40% dilution; produced by NOF Corporation. Because Perhexa C-40 is a 40% dilution, the true amount of addition is also indicated in the above table.

Percumyl D: Dicumyl peroxide, produced by NOF Corporation.

Zinc oxide: Produced by Sakai Chemical Industry Co., Ltd.
Antioxidant: 2,2'-Methylenebis(4-methyl-6-t-butylphenol), produced as Nocrac NS-6 by Ouchi Shinko Chemical Industry Co.
Zinc acrylate: Produced by Nihon Jyoryu Kogyo Co., Ltd.
Zinc stearate: Produced by NOF Corporation.

TABLE 4

|  | a | b | c | d | e | f | g |
|---|---|---|---|---|---|---|---|
| HPF 1000 | 100 | | | | | | |
| Himilan 1605 | | 50 | 68.75 | | | | |
| Himilan 1557 | | 15 | | | | | |
| Himilan 1706 | | 35 | | | | | |
| Dynaron 6100P | | | 31.25 | | | | |
| Pandex T8260 | | | | 50 | | 50 | 50 |
| Pandex T8295 | | | | 50 | 100 | 50 | 50 |
| Pandex T8290 | | | | | | | |
| Isocyanate compound | | | | 9 | 9 | | |
| Isocyanate mixture | | | | | | 20 | |
| Thermoplastic elastomer | | | | 15 | 15 | | |
| Titanium oxide | | | | 3.5 | 3.5 | 3.5 | 3.5 |
| Ultramarine blue | | | | 0.4 | 0.4 | 0.4 | 0.4 |
| Polyethylene wax | | | | 1.5 | 1.5 | 1.5 | 1.5 |
| Montan wax | | | | 0.8 | 0.8 | 0.8 | 0.8 |
| Behenic acid | | | 18 | | | | |
| Calcium hydroxide | | | 2.3 | | | | |
| Calcium stearate | | | 0.15 | | | | |
| Zinc stearate | | | 0.15 | | | | |
| Trimethylolpropane | | 1.1 | | | | | |
| Polytail H | | | 2 | | | | |
| Melt flow rate (at 210° C.) | — | — | — | 7.5 | 7.5 | 2.2 | 1.8 |

Numbers in the table indicate parts by weight.

Trade names for key materials appearing in the table are given below.

HPF 1000 (trade name): A terpolymer produced by E. I. DuPont de Nemours & Co. Composed of about 75 to 76 wt % ethylene, about 8.5 wt % acrylic acid and about 15.5 to 16.5 wt % n-butyl acrylate. All (100%) of the acid groups are neutralized with magnesium ions.

Himilan: Ionomer resins produced by DuPont-Mitsui Polychemicals Co., Ltd.

Dynaron 6100P: A hydrogenated polymer produced by JSR Corporation.

Behenic acid: NAA222-S (beads), produced by NOF Corporation.

Calcium hydroxide: CLS-B, produced by Shiraishi Kogyo.

Polytail H: A low-molecular-weight polyolefin polyol produced by Mitsubishi Chemical Corporation.

Pandex T8260: An MDI-PTMG type thermoplastic polyurethane material. Durometer D resin hardness, 56. Rebound resilience, 45%.

Pandex T8295: An MDI-PTMG type thermoplastic polyurethane material. JIS-A resin hardness, 97. Rebound resilience, 44%.

Isocyanate compound: 4,4'-Diphenylmethane diisocyanate.

Isocyanate mixture: Crossnate EM-30 (an isocyanate masterbatch produced by Ouchi Shinko Chemical Industry Co., Ltd.; 4,4'-diphenylmethane diisocyanate content, 30%; the masterbatch base resin was a polyester elastomer).

Thermoplastic elastomer: A thermoplastic polyetherester elastomer (Hytrel 4001, produced by DuPont-Toray Co., Ltd.) was used.

Polyethylene Wax: Sanwax 161P, produced by Sanyo Chemical Industries, Ltd.

Montan Wax: Licowax E, produced by Clariant (Japan) K. K.

Melt Mass Flow Rate (MFR)

The melt flow rate (or melt index) of the material was measured in accordance with JIS-K7210 (test temperature, 210° C.; test load, 21 N (2.16 kgf)).

The golf balls obtained in above Examples 1 to 7 and Comparative Examples 1 to 10 were each evaluated for ball deflection, ball properties, flight performance, spin rate on approach shots, scuff resistance and feel on impact. The results are shown in Tables 5 to 7.

Hardness Distribution of Solid Core (Shore D Hardness)

The balls were temperature conditioned at 23° C., following which the hardnesses at various positions were measured in terms of the Shore D hardness (using a type D durometer in accordance with ASTM-2240).

Each surface hardness value shown in the table was obtained by measuring the hardness at two randomly chosen points on the surface of each of five cores, and determining the average of the measured values.

Each center hardness value shown in the table was obtained by cutting the solid core into two halves with a fine cutter, measuring the hardness at the center of the sectioned planes on the two hemispheres for each of five cores, and determining the average of the measured values.

Cross-sectional hardness values were obtained by cutting the solid core into two halves and measuring the hardnesses at regions located 4 mm, 8 mm and 12 mm from the center of the cross-section and at the region located 2 to 3 mm inside of the surface.

The values shown in the table are average hardness values for the respective regions on the sectioned planes of two hemispheres for each of five cores.

Surface Hardnesses of Intermediate Layer and Cover

The product was temperature conditioned at 23° C., following which the hardnesses at two randomly chosen points in undimpled land areas on the surface of each of five specimens were measured. Measurements were conducted with a type D durometer in accordance with ASTM-2240.

Deflection of Solid Core and Finished Ball

Using an Instron model 4204 test system manufactured by Instron Corporation, solid cores and finished balls were each compressed at a rate of 10 mm/min, and the difference between deformation at 10 kg and deformation at 130 kg was measured.

Initial Velocity

The initial velocity was measured using an initial velocity measuring apparatus of the same type as the USGA drum rotation-type initial velocity instrument approved by the R&A. The ball was temperature conditioned at 23±10° C. for at least 3 hours, then tested in a chamber at a room temperature of 23±20° C. The ball was hit using a 250-pound (113.4 kg) head (striking mass) at an impact velocity of 143.8 ft/s (43.83 m/s). One dozen balls were each hit four times. The time taken by a ball to traverse a distance of 6.28 ft (1.91 m) was measured and used to compute the initial velocity of the ball. This cycle was carried out over a period of about 15 minutes.

Distance

The total distance traveled by the ball when hit at a head speed (HS) of 40 m/s with a driver (Tour Stage X-DRIVE TYPE 350 PROSPEC, manufactured by Bridgestone Sports Co., Ltd.; loft angle, 10.5°) mounted on a swing robot (Miyamae Co., Ltd.) was measured. The spin rate was measured from high-speed camera images of the ball taken immediately after impact.

Spin Rate on Approach Shots

The spin rate of a ball hit at a head speed of 20 m/s with a sand wedge (abbreviated below as "SW"; Tour Stage X-wedge, manufactured by Bridgestone Sports Co., Ltd.; loft angle, 58°) was measured. The spin rate was measured by the same method as that used above when measuring distance.

Feel

The feel of each ball when teed up and hit with a driver at a head speed of 40 m/s and when hit with a putter was evaluated by ten amateur golfers, and was rated as indicated below based on the number of golfers who responded that the ball had a "soft" feel. An X-DRIVE TYPE 350 PROSPEC having a loft angle of 10° was used as the driver, and a Tour Stage ViQ Model-III was used as the putter. Both clubs are manufactured by Bridgestone Sports Co., Ltd.
 NG: 1 to 3 golfers rated the ball as "soft."
 Ordinary: 4 to 6 golfers rated the ball as "soft."
 Good: 7 to 10 golfers rated the ball as "soft."

Scuff Resistance

Each ball was temperature conditioned at 23° C., then hit at a head speed of 33 m/s with a square-grooved pitching wedge mounted on a swing robot. The condition of the ball after being hit was rated visually by three judges according to the following criteria. Results shown in the table are the average point values obtained for each ball.
 10 points: No visible defects.
 8 points: Substantially no defects.
 5 points: Some defects noted, but ball can be re-used.
 3 points: Condition is borderline, but ball can be re-used.
 1 point: Unfit for reuse.

TABLE 5

| | | Example | | | | | | |
|---|---|---|---|---|---|---|---|---|
| | | 1 | 2 | 3 | 4 | 5 | 6 | 7 |
| Core | Type | No. 1 | No. 2 | No. 3 | No. 4 | No. 4 | No. 5 | No. 6 |
| | Diameter (mm) | 34.7 | 34.7 | 35.7 | 35.7 | 35.7 | 35.7 | 35.7 |
| | Deflection (mm) | 3.6 | 2.8 | 2.8 | 3.2 | 3.2 | 2.8 | 2.8 |
| i | Center hardness | 37 | 39 | 40 | 39 | 39 | 42 | 41 |
| ii | Hardness of region 4 mm from center | 41 | 43 | 44 | 43 | 43 | 45 | 45 |
| iii | Hardness of region 8 mm from center | 45 | 51 | 51 | 49 | 49 | 51 | 51 |
| iv | Hardness of region 12 mm from center | 48 | 54 | 54 | 52 | 52 | 55 | 54 |
| v | Hardness of region 2 to 3 mm inside of surface | 42 | 44 | 45 | 45 | 45 | 46 | 47 |
| vi | Surface hardness | 46 | 50 | 51 | 50 | 50 | 51 | 52 |
| iv – vi | Hardness 12 mm from center – surface hardness | 2 | 4 | 3 | 2 | 2 | 4 | 2 |
| vi – i | Hardness difference between core center and surface | 9 | 11 | 11 | 11 | 11 | 9 | 11 |
| Intermediate layer 1 | Type | a | a | a | a | a | a | a |
| | Thickness (mm) | 1.8 | 1.8 | 2.5 | 2.5 | 2.5 | 2.5 | 2.5 |
| | Surface hardness (Shore D) | 49 | 49 | 49 | 49 | 49 | 49 | 49 |
| | Hardness difference between intermediate layer surface and core surface | 3 | −1 | −2 | −1 | −1 | −2 | −3 |
| Intermediate layer 2 | Type | b | c | | | | | |
| | Thickness (mm) | 1.2 | 1.2 | | | | | |
| | Surface hardness (Shore D) | 62 | 56 | | | | | |
| Cover | Type | d | d | d | d | d | e | d |
| | Surface hardness (Shore D) | 64 | 64 | 64 | 64 | 64 | 59 | 64 |
| | Rebound resilience (%) | 55 | 55 | 55 | 55 | 55 | 56 | 55 |
| | Hardness difference between cover surface and core surface | 18 | 14 | 13 | 14 | 14 | 8 | 12 |
| Finished ball | Deflection (mm) | 2.6 | 2.4 | 2.4 | 2.7 | 2.7 | 2.4 | 2.3 |
| | Diameter (mm) | 42.7 | 42.7 | 42.7 | 42.7 | 42.7 | 42.7 | 42.7 |
| | Weight (g) | 45.5 | 45.5 | 45.5 | 45.5 | 45.5 | 45.5 | 45.5 |
| | Specific gravity | 1.16 | 1.16 | 1.16 | 1.16 | 1.16 | 1.16 | 1.16 |
| | Thickness (mm) | 1.0 | 1.0 | 1.0 | 1.0 | 1.0 | 1.0 | 1.0 |
| Dimples | Number of dimples | 330 | 330 | 330 | 432 | 330 | 432 | 432 |
| | Average dimple depth (mm) | 0.146 | 0.146 | 0.146 | 0.142 | 0.146 | 0.142 | 0.142 |
| | Average dimple diameter (mm) | 4.2 | 4.2 | 4.2 | 3.6 | 4.2 | 3.6 | 3.6 |
| | Number of dimple types | 6 | 6 | 6 | 5 | 6 | 5 | 5 |
| Distance | Spin rate on shots with a driver at HS 40 (rpm) | 2850 | 2980 | 2950 | 2820 | 2820 | 2910 | 2880 |
| | Total distance (m) | 209.0 | 210.0 | 211.0 | 209.0 | 210.5 | 208.5 | 210.0 |
| Spin rate on approach shots at HS 20 (rpm) | | 6130 | 6420 | 6350 | 6220 | 6220 | 6590 | 6280 |
| Initial velocity (m/s) | | 77.5 | 77.5 | 77.6 | 77.5 | 77.5 | 77.5 | 77.6 |
| Scuff resistance | | 7.5 | 8.0 | 8.5 | 8.0 | 8.0 | 7.5 | 7.5 |
| Feel | On shots with a driver at HS 40 | good | good | good | good | good | good | good |
| | On shots with a putter | good | ordinary | ordinary | good | good | good | good |

Note:
Numbers for hardness distribution of core indicate Shore D hardness.

TABLE 6

|  |  | Comparative Example | | | | |
| --- | --- | --- | --- | --- | --- | --- |
|  |  | 1 | 2 | 3 | 4 | 5 |
| Core | Type | No. 7 | No. 8 | No. 9 | No. 4 | No. 10 |
|  | Diameter (mm) | 35.7 | 35.7 | 35.7 | 35.7 | 35.7 |
|  | Deflection (mm) | 1.9 | 4.2 | 3.4 | 3.2 | 3.2 |
| i | Center hardness | 45 | 34 | 39 | 39 | 37 |
| ii | Hardness of region 4 mm from center | 50 | 38 | 44 | 43 | 42 |
| iii | Hardness of region 8 mm from center | 58 | 41 | 46 | 50 | 48 |
| iv | Hardness of region 12 mm from center | 63 | 44 | 52 | 50 | 52 |
| v | Hardness of region 2 to 3 mm inside of surface | 56 | 38 | 51 | 45 | 50 |
| vi | Surface hardness | 60 | 40 | 55 | 50 | 55 |
| iv − vi | Hardness 12 mm from center − surface hardness | 3 | 4 | −3 | 0 | −3 |
| vi − i | Hardness difference between core center and surface | 15 | 6 | 16 | 11 | 18 |
| Intermediate layer 1 | Type | a | a | a | a | a |
|  | Thickness (mm) | 2.5 | 2.5 | 2.5 | 2.5 | 2.5 |
|  | Surface hardness (Shore D) | 49 | 49 | 49 | 49 | 49 |
|  | Hardness difference between intermediate layer surface and core surface | −11 | 9 | −6 | −1 | −6 |
| Intermediate layer 2 | Type |  |  |  |  |  |
|  | Thickness (mm) |  |  |  |  |  |
|  | Surface hardness (Shore D) |  |  |  |  |  |
| Cover | Type | d | d | d | d | d |
|  | Surface hardness (Shore D) | 64 | 64 | 64 | 64 | 64 |
|  | Rebound resilience (%) | 55 | 55 | 55 | 55 | 55 |
|  | Hardness difference between cover surface and core surface | 4 | 24 | 9 | 14 | 9 |
| Finished ball | Deflection (mm) | 1.7 | 3.6 | 2.8 | 2.4 | 2.6 |
|  | Diameter (mm) | 42.7 | 42.7 | 42.7 | 42.7 | 42.7 |
|  | Weight (g) | 45.5 | 45.5 | 45.5 | 45.5 | 45.5 |
|  | Specific gravity | 1.16 | 1.16 | 1.16 | 1.16 | 1.16 |
|  | Thickness (mm) | 1.0 | 1.0 | 1.0 | 2.0 | 1.0 |
| Dimples | Number of dimples | 330 | 330 | 500 | 330 | 330 |
|  | Average dimple depth (mm) | 0.146 | 0.146 | 0.153 | 0.146 | 0.146 |
|  | Average dimple diameter (mm) | 4.2 | 4.2 | 3.1 | 4.2 | 4.2 |
|  | Number of dimple types | 6 | 6 | 3 | 6 | 6 |
| Distance | Spin rate on shots with a driver at HS 40 (rpm) | 3440 | 2580 | 2750 | 2890 | 2780 |
|  | Total distance (m) | 206.0 | 203.0 | 202.5 | 202.5 | 203.5 |
| Spin rate on approach shots at HS 20 (rpm) |  | 6800 | 5850 | 6150 | 6360 | 6170 |
| Initial velocity (m/s) |  | 77.8 | 77 | 77.6 | 76.9 | 77.1 |
| Scuff resistance |  | 4.5 | 9.0 | 7.5 | 6.5 | 7.0 |
| Feel | On shots with a driver at HS 40 | NG | good | NG | NG | NG |
|  | On shots with a putter | NG | good | ordinary | good | ordinary |

TABLE 7

|  |  | Comparative Example | | | | |
| --- | --- | --- | --- | --- | --- | --- |
|  |  | 6 | 7 | 8 | 9 | 10 |
| Core | Type | No. 11 | No. 4 | No. 4 | No. 4 | No. 4 |
|  | Diameter (mm) | 35.7 | 35.7 | 35.7 | 38.9 | 35.7 |
|  | Deflection (mm) | 3.2 | 3.2 | 3.2 | 3.2 | 3.2 |
| i | Center hardness | 39 | 39 | 39 | 39 | 39 |
| ii | Hardness of region 4 mm from center | 43 | 43 | 43 | 43 | 43 |
| iii | Hardness of region 8 mm from center | 49 | 49 | 49 | 49 | 49 |
| iv | Hardness of region 12 mm from center | 52 | 52 | 52 | 52 | 52 |
| v | Hardness of region 2 to 3 mm inside of surface | 45 | 45 | 45 | 45 | 45 |
| vi | Surface hardness | 50 | 50 | 50 | 50 | 50 |
| iv − vi | Hardness 12 mm from center − surface hardness | 2 | 2 | 2 | 2 | 2 |
| vi − i | Hardness difference between core center and surface | 11 | 11 | 11 | 11 | 11 |
| Intermediate layer 1 | Type | a | a | a |  | b |
|  | Thickness (mm) | 2.5 | 2.5 | 2.5 |  | 2.5 |
|  | Surface hardness (Shore D) | 49 | 49 | 49 |  | 62 |
|  | Hardness difference between intermediate layer surface and core surface | −1 | −1 | −1 |  | 12 |
| Intermediate layer 2 | Type |  |  |  |  |  |
|  | Thickness (mm) |  |  |  |  |  |
|  | Surface hardness (Shore D) |  |  |  |  |  |

TABLE 7-continued

|  |  | Comparative Example | | | | |
|---|---|---|---|---|---|---|
|  |  | 6 | 7 | 8 | 9 | 10 |
| Cover | Type | d | f | g | d | d |
|  | Surface hardness (Shore D) | 64 | 65 | 63 | 64 | 64 |
|  | Rebound resilience (%) | 55 | 55 | 55 | 55 | 55 |
|  | Hardness difference between cover surface and core surface | 14 | 15 | 13 | 14 | 14 |
| Finished ball | Deflection (mm) | 2.7 | 2.7 | 2.7 | 2.8 | 2.4 |
|  | Diameter (mm) | 42.7 | 42.7 | 42.7 | 42.7 | 42.7 |
|  | Weight (g) | 45.5 | 45.5 | 45.5 | 45.5 | 45.5 |
|  | Specific gravity | 1.16 | 1.16 | 1.16 | 1.16 | 1.16 |
|  | Thickness (mm) | 1.0 | 1.0 | 1.0 | 1.9 | 1.0 |
| Dimples | Number of dimples | 330 | 330 | 330 | 330 | 330 |
|  | Average dimple depth (mm) | 0.146 | 0.146 | 0.146 | 0.146 | 0.146 |
|  | Average dimple diameter (mm) | 4.2 | 4.2 | 4.2 | 4.2 | 4.2 |
|  | Number of dimple types | 6 | 6 | 6 | 6 | 6 |
| Distance | Spin rate on shots with a driver at HS 40 (rpm) | 2820 | 2830 | 2860 | 2940 | 2820 |
|  | Total distance (m) | 203.0 | 210.0 | 208.5 | 206.0 | 209.0 |
| Spin rate on approach shots at HS 20 (rpm) | | 6250 | 6230 | 6270 | 6240 | 6200 |
| Initial velocity (m/s) | | 76.9 | 77.5 | 77.4 | 77.2 | 77.5 |
| Scuff resistance | | 8.0 | 6.0 | 3.5 | 8.0 | 6.5 |
| Feel | On shots with a driver at HS 40 | good | good | good | good | ordinary |
|  | On shots with a putter | good | good | good | good | NG |

Ball Manufacturability

In Comparative Examples 7 and 8, the molding conditions during mass production were unstable, resulting in a high frequency of problems such as resin scorching. In the examples of the invention and the other comparative examples, the molding conditions during mass production were stable, as a result of which problems such as resin scorching were infrequent.

The results in Tables 5 to 7 show that, in Comparative Example 1, the finished ball had a hardness that was too high, resulting in a hard feel on impact, and also resulting in an excessive spin rate which shortened the distance traveled by the ball. In Comparative Example 2, the core hardness was too low, reducing the rebound and shortening the distance traveled by the ball, and also lowering the performance of the ball on approach shots. In Comparative Example 3, because the core had a surface hardness which was higher than the hardness of the region located 12 mm from the core center, the distance traveled by the ball when hit at a head speed (HS) of 40 m/s decreased, in addition to which the ball also had a harder feel on impact. In Comparative Example 4, the cover was too thick, as a result of which a good rebound was not obtained, shortening the distance traveled by the ball. In Comparative Example 5, because the core had a surface hardness which was higher than the hardness of the region located 12 mm from the core center, the distance traveled by the ball when hit at a head speed (HS) of 40 m/s decreased, in addition to which the ball also had a harder feel on impact. In Comparative Example 6, the use of a polybutadiene rubber synthesized with a nickel catalyst as the core material resulted in a lower rebound and thus a shorter distance. In Comparative Example 7, in which a material obtained by injection molding a dry blend of thermoplastic polyurethane pellets and isocyanate mixture pellets was used as the cover material, the scuff resistance was poor. In Comparative Example 8, in which pellets composed only of thermoplastic polyurethane were used alone as the cover material, the scuff resistance was very poor. In Comparative Example 9, the golf ball, which was a two-piece solid golf ball, had a low rebound and thus traveled a shorter distance. In Comparative Example 10, the surface hardness of the intermediate layer was too high, resulting in a poor feel on impact and a poor scuff resistance.

The invention claimed is:

1. A solid golf ball comprising a solid core and a cover layer that encases the core and has an outermost layer on an outside surface of which are formed a plurality of dimples, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, an inorganic filler, and an antioxidant; the solid core has a deformation, when compressed under a final load of 130 kgf from an initial load of 10 kgf, of from 2.0 to 4.0 mm, and has the hardness distribution shown in the table below; the cover layer has a thickness of from 0.5 to 1.9 mm and a Shore D hardness at the surface of from 50 to 70; the ball has at least one intermediate layer between the core and the cover, any one of which intermediate layer or layers has a surface hardness in Shore D units of from 40 to 60, the intermediate layer or layers having a total thickness of from 0.9 to 7.0 mm; and the golf ball has a deformation, when compressed under a final load of 130 kgf from an initial load of 10 kgf, of from 2.0 to 3.8 mm

| Hardness Distribution in Solid Core | Shore D hardness |
|---|---|
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q) − (S)] | 1 to 10 |
| Hardness difference [(S) − (R)] | 3 to 10 |

2. The solid golf ball of claim 1, wherein the surface hardness of the solid core is lower than the surface hardness of the cover layer, the difference therebetween in Shore D hardness units being from 5 to 20, and at least one intermediate layer has a surface hardness difference with the core, in Shore D hardness units, of 5 or less.

3. The solid golf ball of claim 1, wherein the difference between the surface hardness of the solid core and the center hardness of the solid core, in Shore D hardness units, is from 7 to 17.

4. The solid golf ball of claim 1, wherein the solid core has a diameter of from 31 to 40 mm and the golf ball has a diameter of from 42.67 to 44.0 mm.

5. The solid golf ball of claim 1, wherein the solid core contains from 33 to 45 parts by weight of the unsaturated carboxylic acid or a metal salt thereof, from 0.1 to 1.0 part by weight of the organic peroxide, from 5 to 80 parts by weight of the inorganic filler, and from 0.2 to 1.0 part by weight of the antioxidant per 100 parts by weight of the base rubber.

6. The solid golf ball of claim 1, wherein the dimples total in number from 250 to 420, have an average depth of from 0.125 to 0.150 mm and an average diameter of from 3.7 to 5.0 mm for all dimples, and are configured from at least four dimple types.

7. The solid golf ball of claim 1, wherein one or more intermediate layer is composed of a resin which is a mixture obtained by blending as essential ingredients:
   100 parts by weight of a resin component composed of, in admixture,
       a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100/0 and 0/100, and
   (e) a non-ionomeric thermoplastic elastomer in a weight ratio between 100:0 and 50:50;
   (c) 5 to 80 parts by weight of a fatty acid and/or fatty acid derivative having a molecular weight of from 228 to 1500; and
   (d) 0.1 to 17 parts by weight of a basic inorganic metal compound capable of neutralizing un-neutralized acid groups in the base resin and component (c).

8. The solid golf ball of claim 1, wherein the cover layer is formed by injection molding a single resin blend composed primarily of (A) a thermoplastic polyurethane and (B) a polyisocyanate compound, which resin blend contains a polyisocyanate compound in at least some portion of which all the isocyanate groups on the molecule remain in an unreacted state.

9. The solid golf ball of claim 1, wherein the resin blend further includes (C) a thermoplastic elastomer other than a thermoplastic polyurethane.

10. The solid golf ball of claim 9 wherein, in the resin blend, some portion of the isocyanate groups in component B form bonds with active hydrogens in component A and/or component C, and all other isocyanate groups remain within the resin blend in an unreacted state.

11. The solid golf ball of claim 9, wherein the ingredients in the resin blend have a weight ratio therebetween, expressed as A:B:C, of from 100:{2 to 50}:{0 to 50}.

12. The solid golf ball of claim 9, wherein the ingredients in the resin blend have a weight ratio therebetween, expressed as A:B:C, of from 100:{2 to 30}:{8 to 50}.

13. The solid golf ball of claim 1, wherein components A and B have a combined weight which is at most 90 wt % of the weight of the cover layer as a whole.

14. The solid golf ball of claim 1, wherein the resin blend has a melt mass flow rate (MFR) at 210° C. of at least 5 g/10 min.

15. The solid golf ball of claim 1, wherein component B is one or more polyisocyanate compound selected from the group consisting of 4,4'-diphenylmethane diisocyanate, 2,4-toluene diisocyanate, 2,6-toluene diisocyanate, p-phenylene diisocyanate, xylylene diisocyanate, naphthylene 1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate.

16. The solid golf ball of claim 1, wherein component B is one or more polyisocyanate compound selected from the group consisting of 4,4'-diphenylmethane diisocyanate, dicyclohexylmethane diisocyanate and isophorone diisocyanate.

17. The solid golf ball of claim 1, wherein component C is one or more thermoplastic elastomer selected from the group consisting of polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins.

18. The solid golf ball of claim 1, wherein component C is one or more thermoplastic elastomer selected from the group consisting of polyester elastomers, polyamide elastomers and polyacetals.

* * * * *